(12) United States Patent
Rappoport et al.

(10) Patent No.: US 9,164,309 B2
(45) Date of Patent: Oct. 20, 2015

(54) DISPLAY WITH BROADBAND ANTIREFLECTION FILM

(75) Inventors: Benjamin M. Rappoport, Los Gatos, CA (US); Cheng Chen, San Jose, CA (US); Enkhamgalan Dorjgotov, San Francisco, CA (US); John Z. Zhong, Cupertino, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 13/481,560

(22) Filed: May 25, 2012

(65) Prior Publication Data

US 2013/0314648 A1    Nov. 28, 2013

(51) Int. Cl.
*G02F 1/1335* (2006.01)
*G02B 1/11* (2015.01)
*G02F 1/1333* (2006.01)
*G02B 1/118* (2015.01)

(52) U.S. Cl.
CPC ............ *G02F 1/133502* (2013.01); *G02B 1/11* (2013.01); *G02B 1/118* (2013.01); *G02F 1/13338* (2013.01)

(58) Field of Classification Search
CPC . G02F 1/133502; G02F 1/13338; G02B 1/11; G02B 1/115; G02B 1/118
USPC ............................................. 349/12, 96, 137
See application file for complete search history.

(56) References Cited

U.S. PATENT DOCUMENTS

| 8,157,907 | B2 | 4/2012 | Chiang et al. |
| 8,431,219 | B2* | 4/2013 | Iwata et al. ................... 428/331 |
| 8,502,797 | B2* | 8/2013 | Hashimoto et al. ........... 345/173 |
| 2002/0145593 | A1 | 10/2002 | Boyd et al. |

(Continued)

FOREIGN PATENT DOCUMENTS

| WO | 2011031215 | 3/2011 |
| WO | 2011033818 | 3/2011 |

(Continued)

OTHER PUBLICATIONS

Vang et al. "Broadband Antireflection (BBAR) Nanostructure Contrast Enhancement (NCEF) Films for Electronic Optical Display," 2011 SID International Symposium, May 19, 2011.

(Continued)

*Primary Examiner* — Nathanael R Briggs
(74) *Attorney, Agent, or Firm* — Treyz Law Group; G. Victor Treyz; Joseph F. Guihan

(57) ABSTRACT

Display layers in an electronic device may be used to generate images. The display layers may include liquid crystal display layers such as upper and lower polarizers and a layer of liquid crystal material. A display cover layer may be mounted in a housing adhesive. A touch sensor layer may be mounted under the display cover layer. An air gap may separate the upper polarizer from the touch sensor layer and display cover layer. Antireflection coatings may be formed on the lower surface of the display cover layer or touch sensor layer and may be formed on the upper surface of the upper polarizer. The antireflection coatings may include coatings formed from a polymer hard coat covered with a polymer layer having a different index of refraction and may include broadband antireflection coating material formed from textured polymer or other structure exhibiting a continuously varying index of refraction.

18 Claims, 13 Drawing Sheets

(56) References Cited

U.S. PATENT DOCUMENTS

| | | |
|---|---|---|
| 2003/0011315 A1* | 1/2003 | Ito et al. .................. 315/169.3 |
| 2006/0132922 A1* | 6/2006 | Takao et al. ................. 359/601 |
| 2009/0080073 A1* | 3/2009 | Irita et al. .................... 359/485 |
| 2010/0079698 A1* | 4/2010 | Matsumoto et al. ........... 349/58 |
| 2010/0149073 A1 | 6/2010 | Chaum et al. |
| 2010/0165551 A1* | 7/2010 | Chen et al. ............ 361/679.01 |
| 2010/0227085 A1 | 9/2010 | Yoshihara |
| 2010/0328776 A1* | 12/2010 | Sanari et al. ................. 359/601 |
| 2011/0164210 A1* | 7/2011 | Tsuda ................ H01L 51/5281 349/96 |
| 2011/0277361 A1 | 11/2011 | Nichol et al. |
| 2012/0134023 A1 | 5/2012 | Imaoku et al. |
| 2012/0182261 A1* | 7/2012 | Wang .................... G06F 3/044 345/174 |

FOREIGN PATENT DOCUMENTS

| | | |
|---|---|---|
| WO | 2011072227 | 6/2011 |
| WO | 2012027587 | 3/2012 |

OTHER PUBLICATIONS

Vang et al. "Broadband Antireflection (BBAR) Nanostructure Contrast Enhancement (NCEF) Films for Electronic Optical Display Applications," SID Internation Symposium, May 19, 2011.

Taguchi "Ultra Low-Reflective 60-inch LCD with uniform Moth-eye Surface for Digital Signage," SID International Symposium, May 2010.

\* cited by examiner

DISPLAY WITH BROADBAND ANTIREFLECTION FILM

BACKGROUND

This relates generally to electronic devices, and, more particularly, to electronic devices with displays.

Electronic devices such as computers, cellular telephones, televisions, and other equipment often have displays. For example, an electronic device may have a liquid crystal display that includes upper and lower polarizer layers, a thin-film transistor layer and a color filter layer that are interposed between the upper and lower polarizer layers, and a layer of liquid crystal material interposed between the thin-film transistor layer and color filter layer.

To prevent damage to the display, a protective layer of cover glass may be provided. In displays with touch sensors, a touch sensor panel may be attached to the underside of the display cover glass.

To reduce unwanted reflections within a display, layers of material in the display such as the lower surface of the touch sensor panel and the upper surface of the upper polarizer are sometime coated with antireflection coatings. These coatings are formed using a wet coating process and are therefore referred to as wet antireflection coatings. During formation of a wet antireflection coating on a substrate, liquid coating materials are deposited on a surface of a substrate. By drying the liquid coating materials, clear antireflection films can be formed.

Some displays use a full lamination process in which the touch sensor panel is laminated to underlying layers such as the upper polarizer layer using adhesive. Fully laminated displays may exhibit satisfactory display performance, but can be difficult or impossible to rework in the event that a touch sensor component requires replacement during manufacturing.

To allow a display to be reworked, the touch sensor panel in a display may be separated from the upper polarizer by an air gap. During manufacturing, devices that contain defective touch sensor parts can be reworked. Wet antireflection layers may be formed on the lower surface of the touch sensor panel and on the upper surface of the upper polarizer on opposing sides of the air gap. If care is not taken, however, pressure from a user's finger on the cover glass on the front of a display can lead to undesirable visible artifacts such as Newton's rings. If, for example, a user presses inwardly on the cover glass on a display, the cover glass may flex inwardly towards the upper polarizer. With sufficient pressure, the inner surface of the cover glass or the inner surface of a touch panel mounted on the cover glass may bridge the air gap and come into contact with the upper surface of the polarizer, leading to the production of unsightly Newton's rings on the display.

It would therefore be desirable to be able to provide improved displays for electronic devices.

SUMMARY

An electronic device may be provided with a display. The display may have display layers that contain an array of display pixels for displaying images for a user.

The display layers may include liquid crystal display layers such as upper and lower polarizers, a thin-film transistor layer containing an array of pixel electrodes and associated thin-film transistor circuitry, a color filter layer, and a layer of liquid crystal material.

The electronic device may have a housing. A display cover layer may be mounted in the housing adhesive. A touch sensor layer may be mounted under the display cover layer.

An air gap may separate the upper polarizer from the touch sensor layer and display cover layer. Antireflection coatings may be formed on the lower surface of the display cover layer or touch sensor layer and may be formed on the upper surface of the upper polarizer. The surfaces of the antireflection coatings may face one another across the air gap.

The antireflection coatings may include wet antireflection coatings such as coatings formed from a polymer hard coat covered with a polymer layer having a different index of refraction. The antireflection coatings may also include broadband antireflection coating films. A broadband antireflection film may be formed from textured polymer or other structure exhibiting a continuously varying index of refraction as a function of distance through the film. A device may contain a pair of opposing broadband antireflection coatings or may contain an antireflection layer such as a wet antireflection layer and a broadband antireflection layer.

Further features of the invention, its nature and various advantages will be more apparent from the accompanying drawings and the following detailed description of the preferred embodiments.

DETAILED DESCRIPTION

Electronic devices may be provided with broadband antireflection films. A broadband film may have a surface texture or other configuration that gives rise to a continuously varying index of refraction as a function of distance perpendicular to the surface of the film. At the outermost surface of the film, the film may exhibit an index of refraction equal to that of air, providing a smooth interface (i.e., minimal index of refraction discontinuity) with an air gap in a display. Broadband antireflection films of this type, which may sometimes be referred to as moth-eye films, may be used to decrease unwanted reflections in a display. The broadband films may also be used to prevent or at least reduce the formation of undesired visual artifacts such as Newton's rings. Multiple broadband films may be used or a broadband film may be used in conjunction with a wet antireflection layer.

Figure 1:
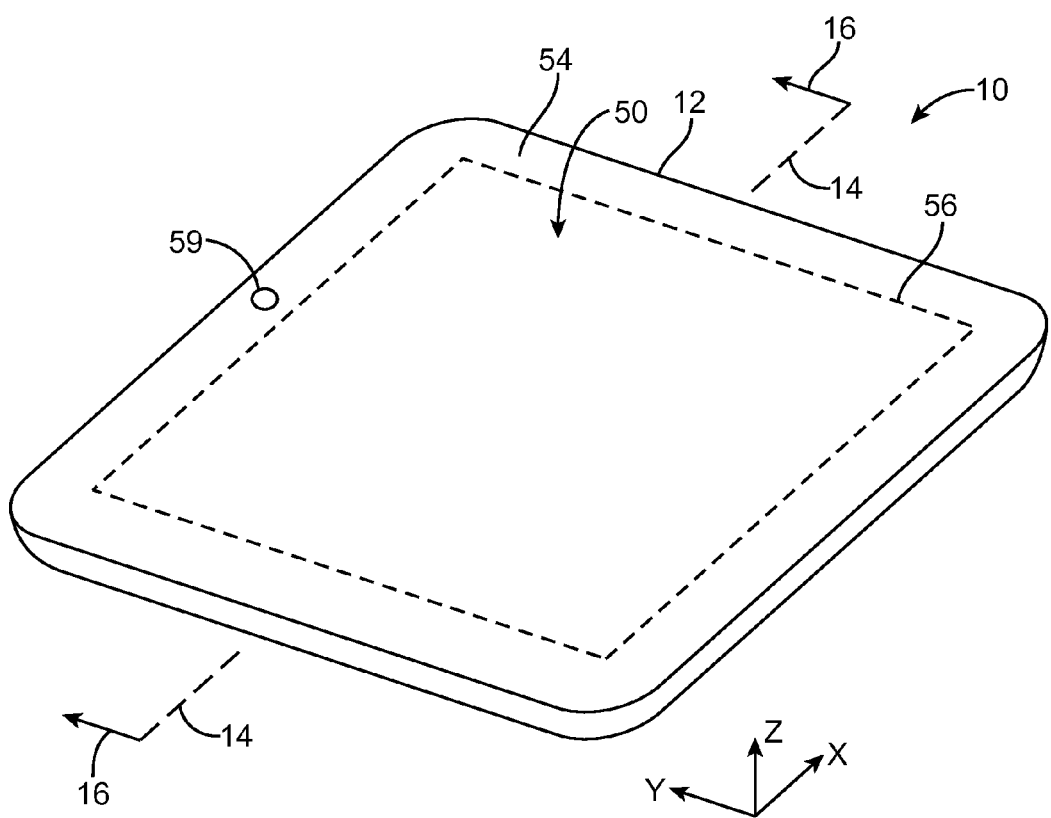
FIG. 1 is a front perspective view of an illustrative electronic device of the type that may be provided with display structures in accordance with an embodiment of the present invention.

An illustrative electronic device in which broadband antireflection film may be used is shown in FIG. 1. Device 10 may include one or more layers of antireflection film. For example, device 10 may have one or more layers of broadband antireflection film having an index of refraction that varies as a function of distance perpendicular to the surface of the film.

As shown in FIG. 1, device 10 may have a display such as display 50. Display 50 may be mounted on a front (top) surface of device 10 or may be mounted elsewhere in device 10. Device 10 may have a housing such as housing 12. Housing 12 may have curved portions that form the edges of device 10 and a relatively planar portion that forms the rear surface of device 10 (as an example). Housing 12 may also have other shapes, if desired.

Housing 12 may be formed from conductive materials such as metal (e.g., aluminum, stainless steel, etc.), carbon-fiber composite material or other fiber-based composites, glass, ceramic, plastic, other materials, or combinations of two or more of these materials.

Device 10 may have user input-output devices such as button 59. Display 50 may be a touch screen display that is used in gathering user touch input or may be a display that is insensitive to touch. The surface of display 50 may be covered using a dielectric display cover layer such as a planar cover glass member or a clear layer of plastic. The central portion of display 50 (shown as region 56 in FIG. 1) may be an active region containing display pixels to display images for a user. The active region may also contain touch sensor components that are sensitive to touch input. The peripheral portion of display 50 such as region 54 may be an inactive region that is free from touch sensor components and that does not display images. If desired, a borderless or nearly borderless design may be used for device 10. The example of FIG. 1 is merely illustrative.

Figure 2:
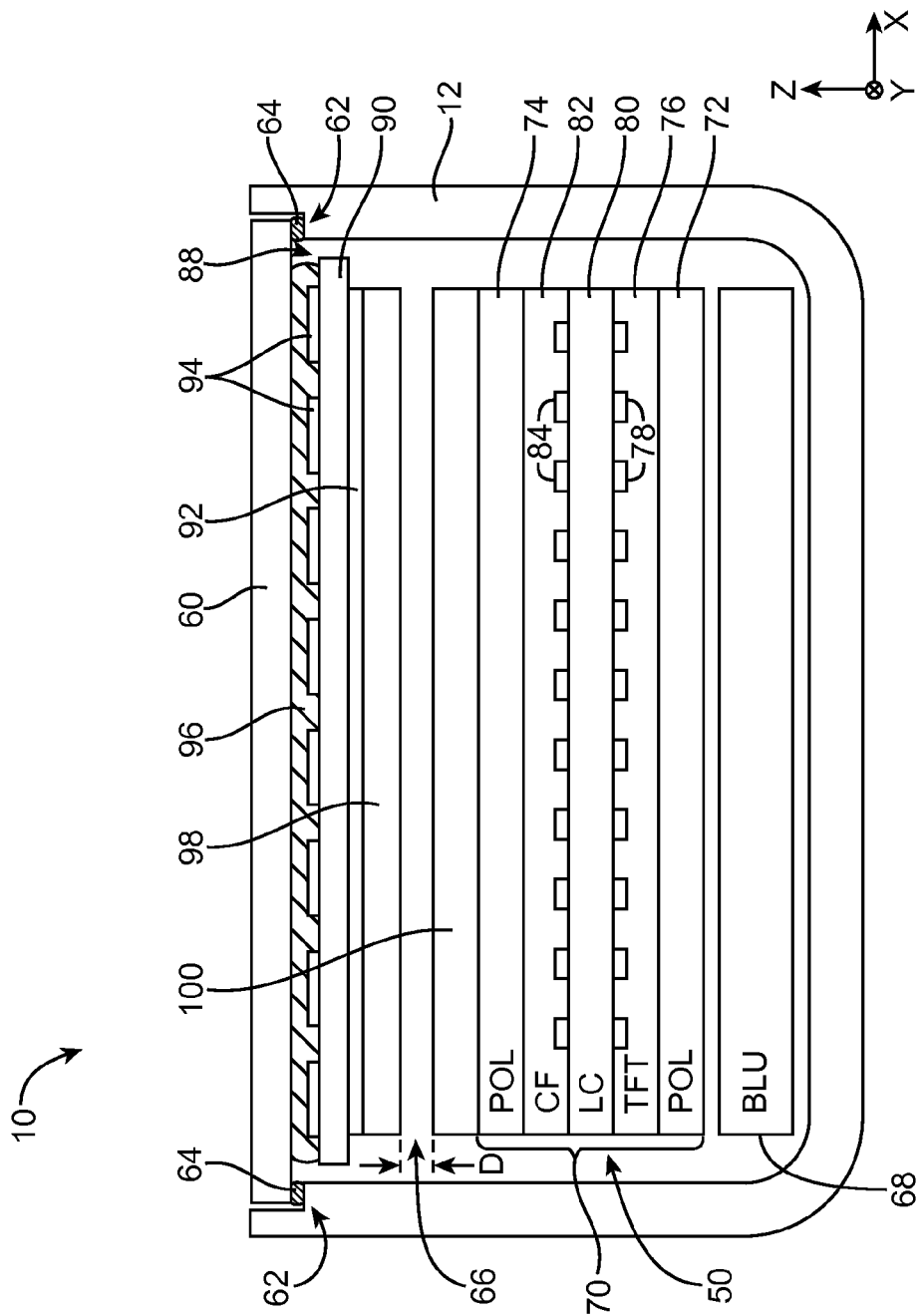
FIG. 2 is a cross-sectional side view of an electronic device with display structures in accordance with an embodiment of the present invention.

A cross-sectional side view of device 10 taken along line 14 of FIG. 1 and viewed in direction 16 is shown in FIG. 2 (not to scale). As shown in FIG. 2, device 10 may include a display cover layer such as display cover layer 60. Display cover layer 60 may be attached to ledge portion 62 of housing wall 12 using adhesive 64. To decouple display cover layer from potentially heavy display components in housing 12 and thereby improve the reliability of adhesive 64 in holding display cover layer 60 in place during a drop event or other unexpected impact to device 10, it may be desirable to form an air gap such as air gap 66 among the layers of material that make up display 50. The thickness D of air gap 66 may be, for example, 0.2 mm, less than 0.3 mm, in the range of 0.1 to 0.3 mm, etc. By incorporating air gap 66 into device 10, display cover layer 60 need not carry the weight associated with display components such as a color filter layer, thin-film transistor layer, and other such display layers.

Backlight for display 50 may be provided by a backlight unit such as backlight unit 68. Backlight unit 68 may include a light source such as an array of light-emitting diodes or a lamp. Light from the light source may be launched into a light guide plate formed from a planar rectangular sheet of plastic. The light that is launched into the light guide plate may travel laterally (in the X-Y plane of FIG. 2) due to total internal reflection. To improve backlight efficiency, a reflector such as a white sheet of plastic may be located below the light guide plate. Light that leaks vertically upwards in direction Z from the light guide plate may serve as backlight for display 14.

Display 50 may include display layers 70. In general, display 50 may be a liquid crystal display, a plasma display, an electrowetting display, an electrophoretic display, a light-emitting diode display such as an organic light-emitting diode display, or other suitable display. Configurations in which display 50 has been formed using liquid crystal display technology are sometimes described as an example. This is, however, merely illustrative. Any suitable type of display technology may be used in forming display 50, if desired.

Display layers 70 may be, for example, liquid crystal display layers. Layers 70 may include a lower polarizer such as polarizer layer 72 and an upper polarizer such as upper polarizer layer 74. Liquid crystal display layers may be sandwiched between lower polarizer layer 72 and upper polarizer layer 74. Liquid crystal display layers 70 may include thin-film transistor layer 76 and color filter layer 82. Thin-film transistor layer 76 may be formed from a transparent substrate material such as a layer of glass or plastic. Thin-film transistor circuitry 78 may be used to form an array of display pixels having electrodes. During operation of display 50, signals from a display driver circuit may be used to control the operation of the display pixels in the array by modulating the electric field that is imposed on liquid crystal layer 80 by the electrodes. In this way, the display driver circuit may display images on display 50 for a user of device 10. Color filter layer 82 may include an array of color filter elements (e.g., red, green, and blue elements) for providing display 50 with the ability to display color images.

Device 10 may be provided with an optional touch sensor array such as touch sensor array 88. Touch sensor array 88 may be mounted on the lower (innermost) surface of display cover layer 60 using adhesive 96 (e.g., optically clear adhesive). Touch sensor array 88 may include a touch sensor substrate such as substrate 90. Substrate 90 may be formed from a layer of clear glass, clear plastic, or other transparent dielectric. Patterned transparent electrodes such as electrodes 94 and 92 may be formed on the upper and lower surfaces of substrate 90, respectively. Any suitable pattern may be used for electrodes 94 and 92 (e.g., diagonally interconnected checkerboard patterns, patterns with vertical and horizontal strips of electrode material, etc.). With one illustrative configuration, electrodes 94 may be formed from strips of conductive material that run parallel to the Y axis of FIG. 2 and electrodes 92 may be formed from strips of conductive material that run parallel to the X axis of FIG. 2. Electrodes 92 and 94 may be formed from a transparent conductive material such as indium tin oxide and may be used in forming capacitive touch sensor electrodes for a capacitive touch sensor array.

Antireflection layers such as layers 98 and 100 may be formed on the display layer surfaces that face gap 66. For example, antireflection layer 98 may be formed on the lower surface of touch sensor array 88. A layer of pressure sensitive adhesive may be used to attach antireflection coating 98 to touch sensor array 88. In configurations in which touch sensor array 88 is not present in device 10 (e.g., because display 50 is being implemented using a touch insensitive design), antireflection coating 98 may be formed on the innermost surface of display cover layer 60 instead of the innermost surface of touch sensor array 88.

Antireflection layer 100 may be formed on the upper (outermost) surface of display layers 70. For example, in a liquid crystal display arrangement, antireflection coating 100 may be formed on the outermost surface of upper polarizer layer 74 (e.g., using a layer of pressure sensitive adhesive).

Figure 3:
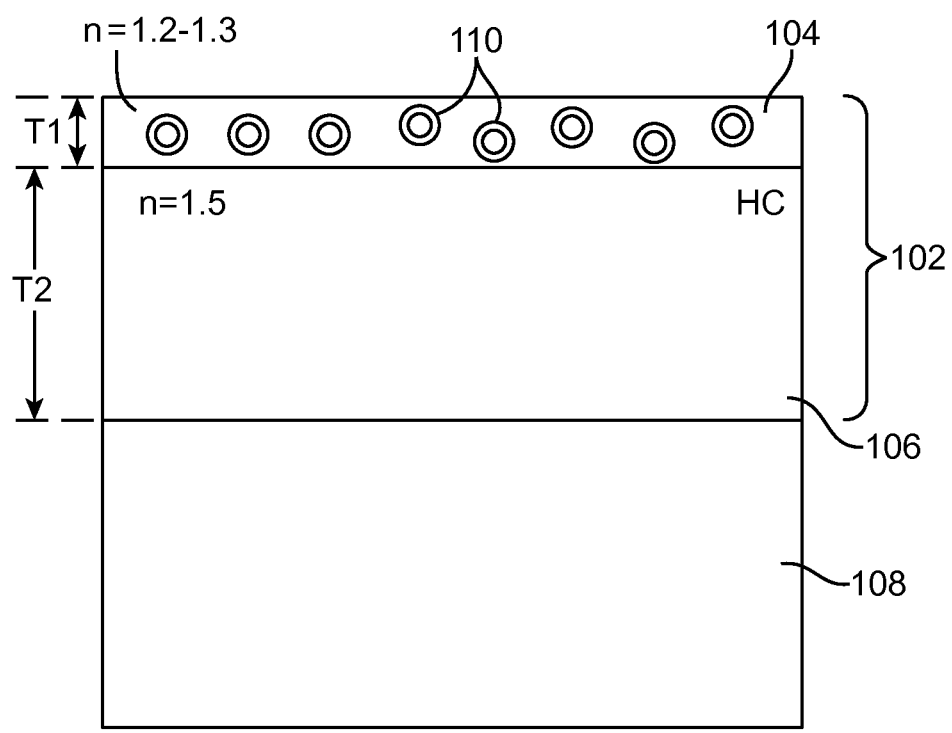
FIG. 3 is a cross-sectional side view of a substrate with a wet antireflection coating that contains hollow silica spheres to adjust the index of refraction of one of the layers in the antireflection coating in accordance with an embodiment of the present invention.

FIG. 3 shows an illustrative antireflection coating arrangement that may be used for forming antireflection coatings such as coating 98 and/or coating 100. As shown in FIG. 3, antireflection coating 102 may be formed on a substrate such as substrate 108. Coating 102 may be, for example, coating 98 or coating 100 of FIG. 2. Substrate 108 may be upper polarizer 74 in display layers 70 or may be touch sensor array 88 or display cover layer 60.

Antireflection coating 102 may include a first layer such as layer 106 and a second layer such as layer 104. Layer 106 may be formed form a transparent material having an index of refraction of about 1.5 (e.g., a photoacrylic polymer) and may have a thickness T2 of about 5-7 microns, a thickness of less than 15 microns, a thickness of 1-15 microns, or a thickness of more than 3 microns (as examples). Layer 106 may sometimes be referred to as a hard coat.

Layer 104 may be formed from a polymer that contains hollow silica beads 110 (e.g., hollow spheres having a diameter of about 30 nm, 10-40 nm, less than 100 nm, or other suitable size). The presence of hollow silica beads in polymer layer 104 may configure layer 104 so that layer 104 exhibits an index of refraction of about 1.2 to 1.3 (i.e., an index that is different from the index of layer 106). The thickness T1 of layer 104 may be, for example, about 100 nm (e.g., a thickness of 20-500 nm or other suitable thickness value). By proper selection of the indices of refraction and thicknesses of layers 104 and 106, coating 102 may be configured to serve as an antireflection coating at frequencies of interest (e.g., at visible light wavelengths). Coating 102 of FIG. 3 may sometimes be referred to as a wet antireflection coating or wet antireflection layer.

Figure 5:
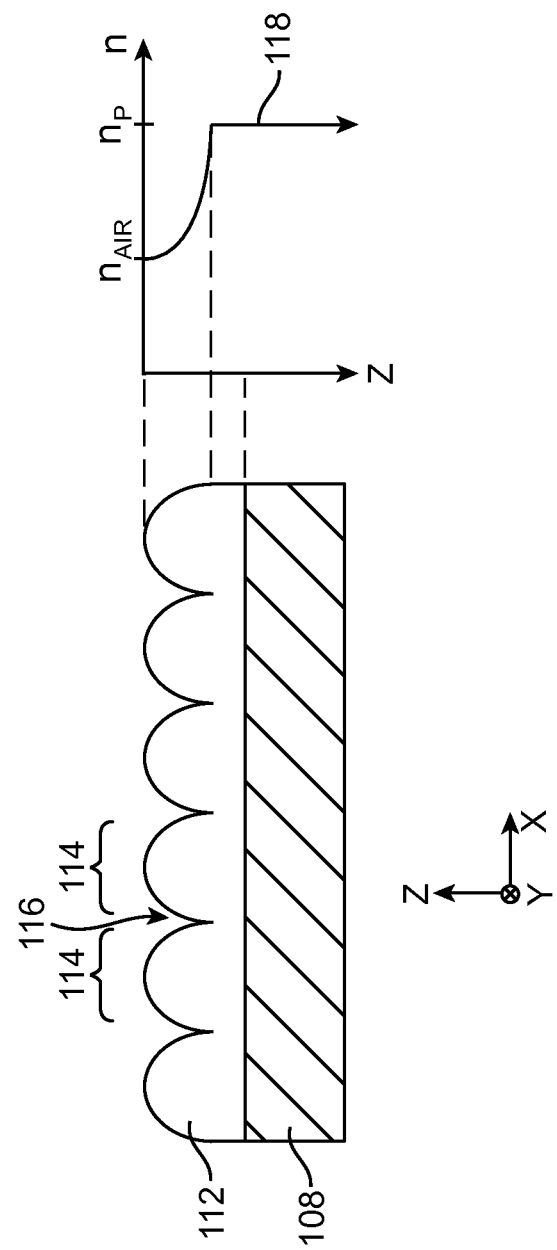
FIG. 5 is a cross-sectional side view of a substrate with a broadband antireflection film having a surface texture configured to produce a continuously varying index of refraction at different depths into the film in accordance with an embodiment of the present invention.

Another illustrative configuration for a wet antireflection coating for display 50 is shown in FIG. 5. In the configuration of FIG. 5, coating 106 may be, for example, a polymer layer such as a hard coat layer with a thickness of about 5-7 microns, 1-15 microns, or other suitable thickness values (as examples) and an index of refraction of about 1.5. Coating 104' may be formed from a layer of fluorinated polymer. Coating 104' may exhibit an index of refraction of about 1.3. The thickness T1 of coating layer 104' may be about 100 nm, 20-500 nm, or other values (as examples). By selecting appropriate indices of refraction and thicknesses for layers 106 and 104' in coating 102, coating 102 may be configured to serve as an antireflection coating.

An antireflection layer with a gradually changing index of refraction as a function of vertical dimension Z may be used as an antireflection coating in display 50. This type of antireflection layer may exhibit a relatively broadband antireflection characteristic and may therefore sometimes be referred to as a broadband antireflection layer.

An illustrative broadband antireflection layer is shown in FIG. 5. As shown in FIG. 5, broadband antireflection layer 112 may include protrusions such as protrusions 114 that are separated from each other by interposed valleys 116. Protrusions 114 may have a tapered shape. Due to the tapered shape, protrusions 114 are wider in the X-Y plane near the surface of substrate 108 than at the tips of protrusions 114. This causes the index of refraction of layer 112 to gradually change as a function of dimension Z, as shown by curve 118 in the graph on the right-hand side of FIG. 5. At the tips of protrusions 114 in layer 112, the index of refraction of layer 112 matches the index of refraction of ambient air in the air gap that lies adjacent to layer 112. At decreasing Z values (distance into the film), the widening lateral dimension of protrusions 114 causes the index of refraction n of layer 112 to gradually (continuously) rise (e.g., to $n_p$, which is the index of refraction for bulk material of the type used to construct layer 112). The value of $n_p$ may be equal to the index of refraction of substrate layer 108 or may have other suitable values. Layer 112 may be formed from a polymer or other suitable clear material. The textured surface of layer 112 may be formed using an embossing roller or other suitable equipment. If desired, broadband antireflection coatings (e.g., coatings with continuously varying indices of refraction such as layer 112 of FIG. 5 may be formed using a film with nanoparticles or other structures. The use of a textured surface for layer 112 is merely illustrative.

By incorporating at least one layer of broadband antireflection coating material such as broadband antireflection layer 112 of FIG. 5 into display 50 adjacent to air gap 66, display 50 may be prevented from generating undesirable visible artifacts such as Newton's rings when a user presses against display cover layer 60 and flexes display layer 60 inwardly to bridge gap 66. Because display 50 is therefore immune (or nearly immune) to producing undesired visible artifacts such as Newton's rings, component flatness variations may be tolerated that lead to occasional contact between the opposing surfaces that are adjacent to air gap 66. This allows the size of air gap 66 to be minimized.

Figure 6:
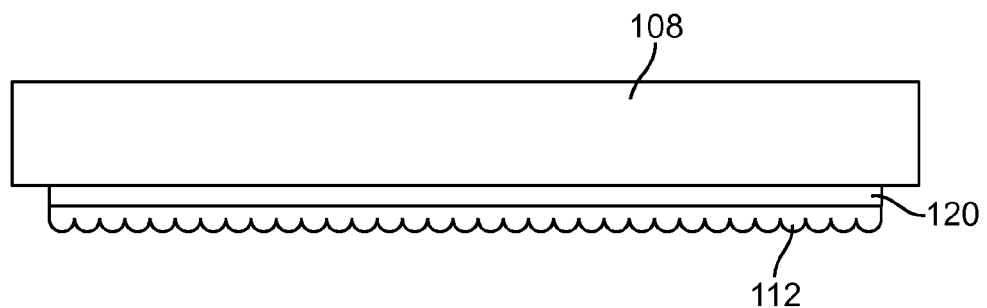
FIG. 6 is a cross-sectional side view of a substrate such as a display cover layer that has been coated with a layer of broadband antireflection film in accordance with an embodiment of the present invention.

FIG. 6 is a cross-sectional diagram showing how substrate 108 (e.g., display cover layer 60) may be provided with an antireflection coating such as broadband antireflection layer 112 of FIG. 5. As shown in FIG. 6, layer 112 may be attached to the innermost (lower) surface of display cover layer 60 using a layer of adhesive such as pressure sensitive adhesive layer 120. If desired, adhesive layer 120 may be omitted (e.g., by forming antireflection layer 112 directly on a substrate by depositing a polymer liquid and embossing and curing the liquid).

Figure 7:
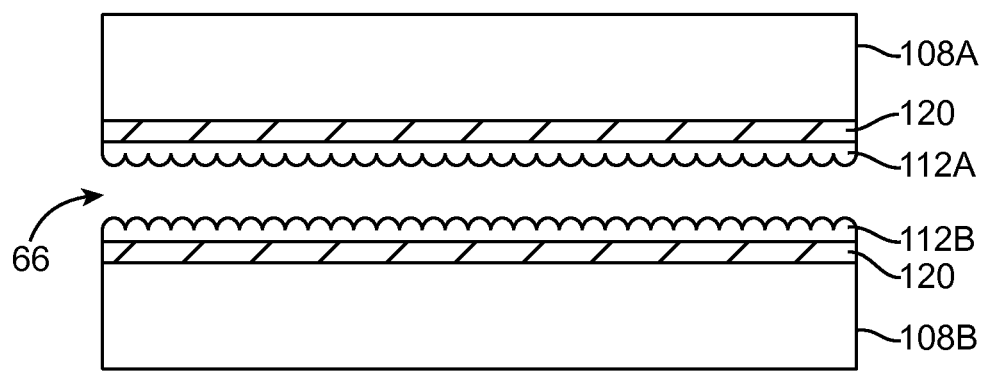
FIG. 7 is a cross-sectional side view of display structures having two opposing layers of broadband antireflection film in accordance with an embodiment of the present invention.

If desired, broadband antireflection coating layers may be formed on the upper and lower sides of gap 66. As shown in FIG. 7, for example, broadband coating layers 112 may be formed on the innermost surface of substrate 108A (e.g., touch sensor array layer 88 or display cover layer 60) and on the outermost surface of substrate 108B (e.g., upper polarizer layer 74). Layers of adhesive such as pressure sensitive adhesive 120 may be used in attaching broadband antireflection coating layers 112A and 112B to substrates 108A and 108B, respectively.

Figure 4:
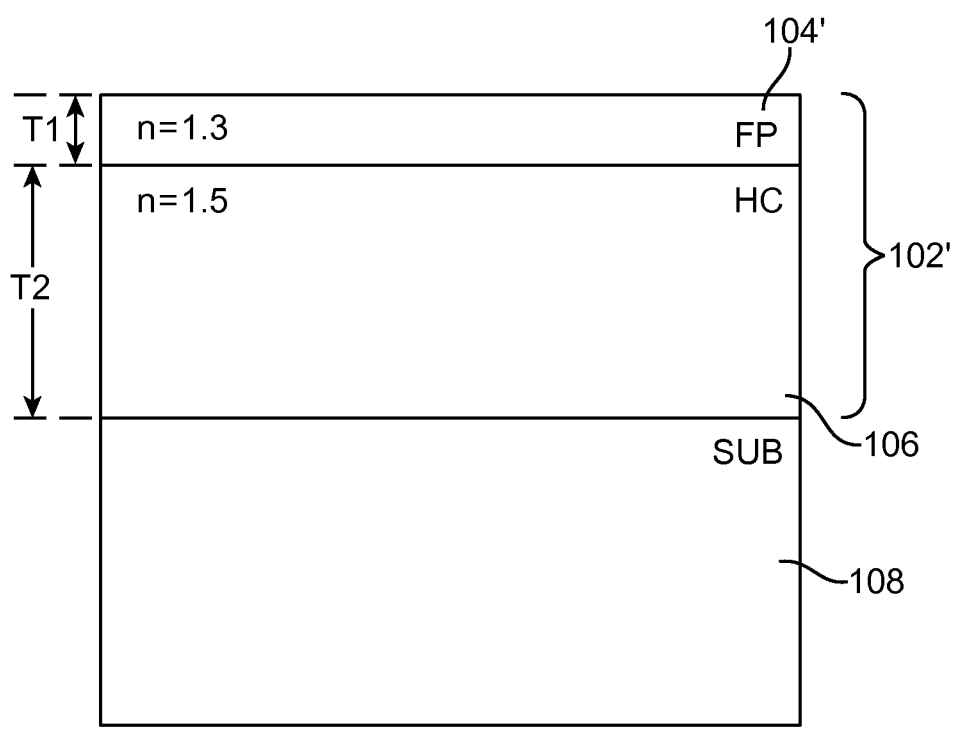
FIG. 4 is a cross-sectional side view of a substrate with a wet antireflection coating that contains a lower hard coat layer and an upper fluorinated polymer layer in accordance with an embodiment of the present invention.
Figure 8:
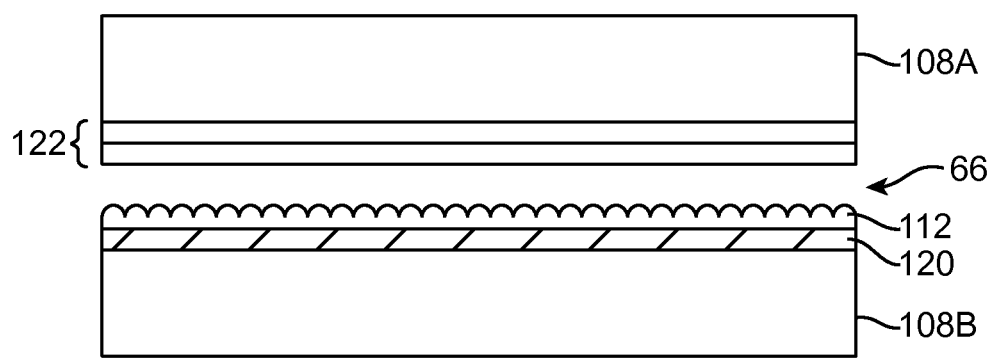
FIG. 8 is a cross-sectional side view of display structures having an upper wet antireflection coating and a lower broadband antireflection coating in accordance with an embodiment of the present invention.

As shown in FIG. 8, broadband antireflection coating 112 may be formed on lower substrate 108B (e.g., upper polarizer 74 or other suitable display layer adjacent to air gap 66) and antireflection coating 122 (e.g., a coating such as antireflection coating 102 of FIG. 3 or 102' of FIG. 4 or other suitable antireflection coating) may be formed on upper substrate layer 108A. Upper substrate layer 108A may be display cover layer 60 or touch sensor array 88 (as examples). Even though only a single layer of broadband antireflection coating is used in the arrangement of FIG. 8, the creation of Newton's rings may be satisfactorily suppressed.

Figure 9:
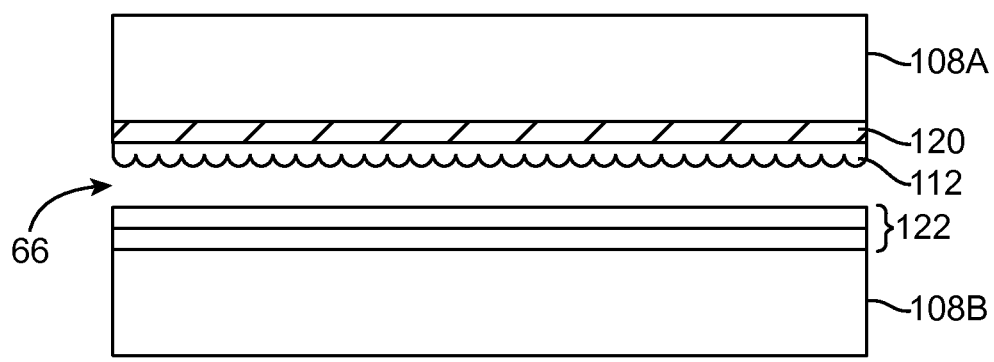
FIG. 9 is a cross-sectional side view of display structures having a lower wet antireflection coating and an upper broadband antireflection coating in accordance with an embodiment of the present invention.

In the illustrative configuration of FIG. 9, broadband antireflection coating 112 has been formed on upper substrate 108A (e.g., display cover layer 60 or touch sensor array 88) and antireflection coating 122 (e.g., an antireflection coating such as coating 102 of FIG. 3 or 102' of FIG. 4 or other suitable antireflection coating) may be formed on lower substrate layer 108B. Upper substrate layer 108A may be display cover layer 60 or touch sensor array 88 (as examples). Lower substrate layer 108B may be, for example, upper polarizer layer 74. As with the illustrative configuration of FIG. 8, the single layer of broadband antireflection coating that is used in the arrangement of FIG. 9 may help suppress the creation of undesirable visual artifacts such as Newton's rings during the use of device 10.

As shown in FIGS. 8 and 9, a layer of adhesive such as pressure sensitive adhesive 120 may be used in attaching broadband antireflection layer 112 to a substrate. If desired, pressure sensitive adhesive 120 may be omitted. For example, pressure sensitive adhesive 120 need not be used in a configuration in which layer 112 is formed by depositing a polymer on a substrate prior to use of an embossing tool to texture the surface of layer 112 to form protrusions 114 and valleys 116 of the type shown in FIG. 5.

Figure 10:
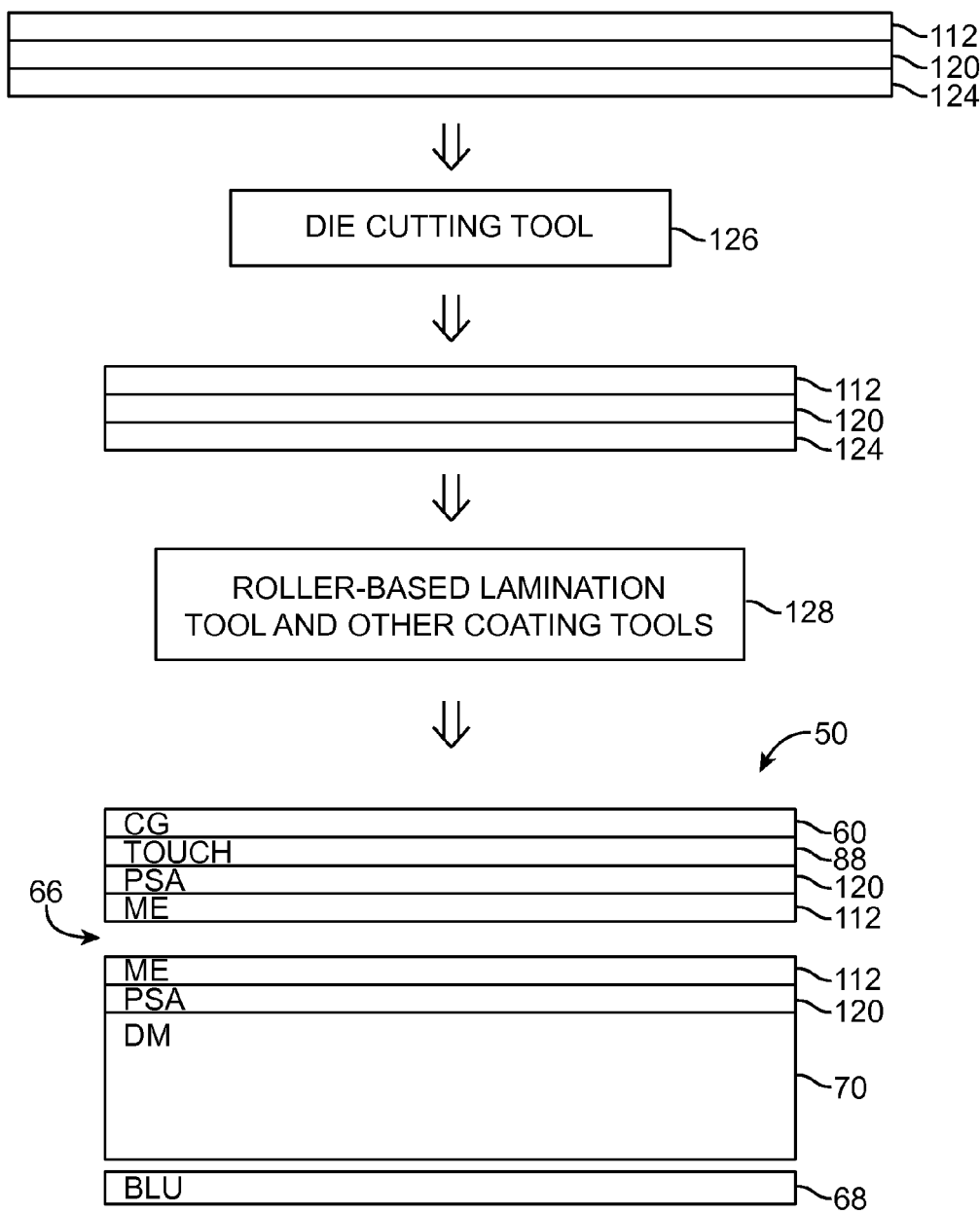
FIG. 10 is a diagram showing equipment and techniques of the type that may be used in forming display structures with antireflection layers in accordance with the present invention.

FIG. 10 is a diagram showing how broadband antireflection coatings 112 may be formed on layers of display 50. Initially, roller-based embossing equipment or other equipment may be used to form broadband antireflection layer 112 on a layer of pressure sensitive adhesive, backed by a release liner such as release liner 124.

A cutting tool such as a cutting die, laser, or other equipment 126 may be used to cut out a portion of broadband antireflection coating 112.

Equipment such as roller-based lamination equipment or other equipment may then be used to remove release liner 124 from adhesive layer 120 and attach broadband antireflection layer 112 to desired portions of display 50 (e.g., touch panel 88, display cover layer 60, upper polarizer 74 in display layers 70, etc.).

Figure 11:
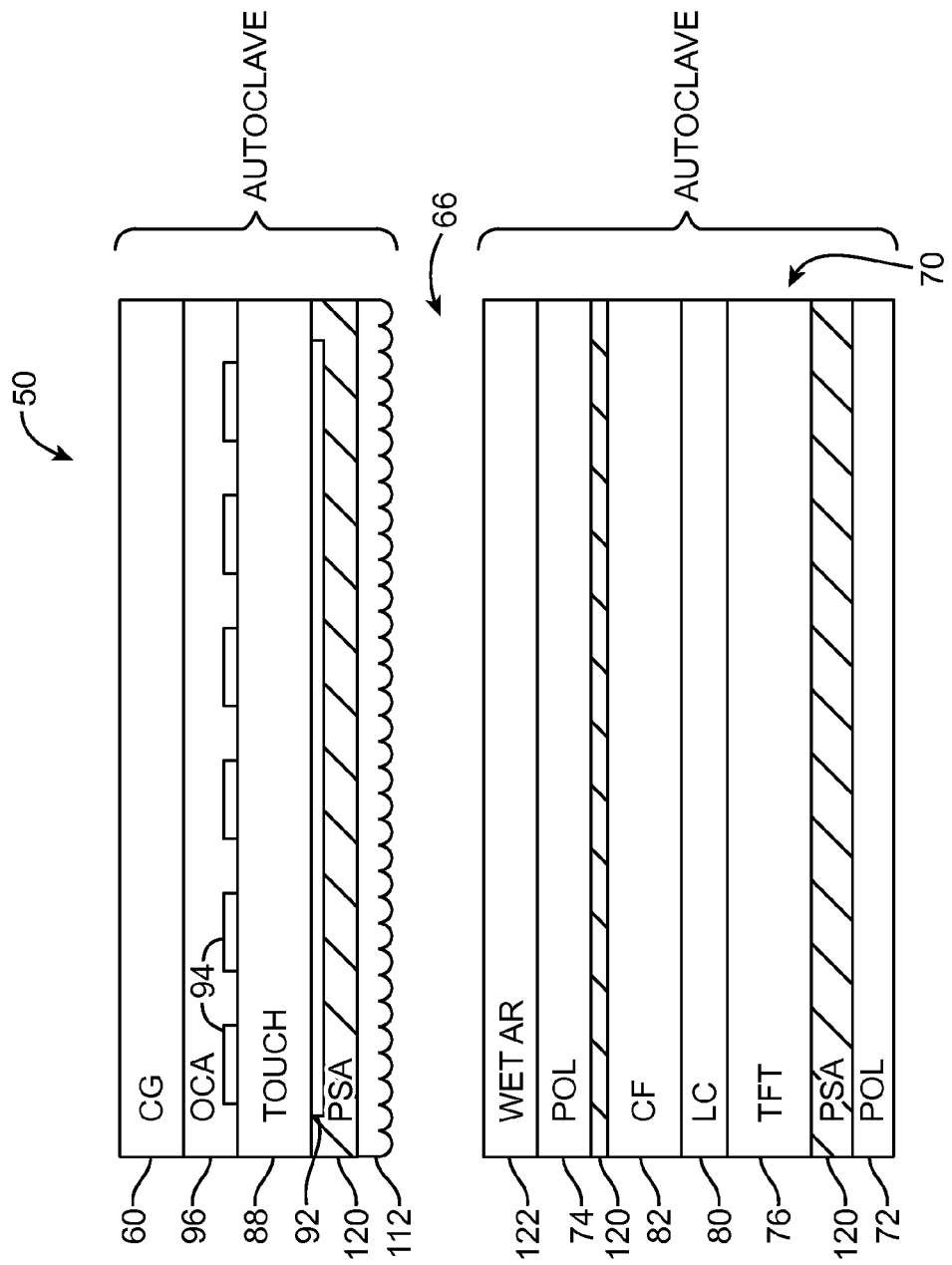
FIG. 11 is a cross-sectional side view of illustrative display structures showing which portions of the display structures may be autoclaved together in accordance with an embodiment of the present invention.

FIG. 11 shows how separate autoclave operations may be used to laminate display layers such as layers 60, 88, and 112 together in the portion of display structures that lie above air gap 66 and may be used to laminate display layers 70 together in the portion of display structures that lie below air gap 66. During autoclave operations, pressure sensitive adhesive layers 120 may be cured.

Figure 12:
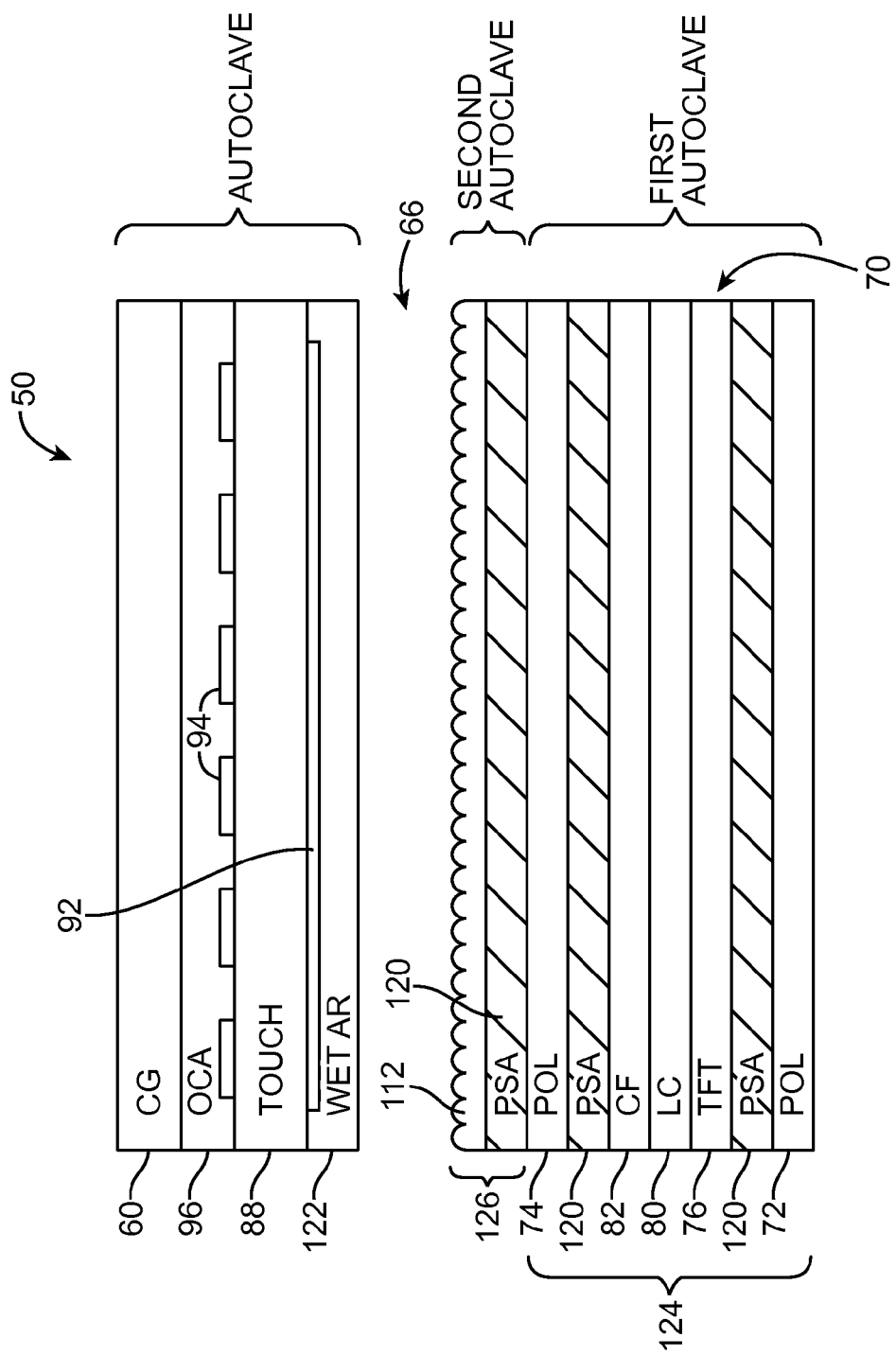
FIG. 12 is a cross-sectional side view of display structures showing how different portions of the display structures may be formed using separate autoclave operations in accordance with an embodiment of the present invention.

FIG. 12 shows how autoclave operations may be used to laminate display layers such as layers 60 and 88 together (along with antireflection coating 122) in the portion of display structures that lie above air gap 66. FIG. 12 also shows how first and second autoclave operations may be used in forming display layers 70. In a first autoclave operation, layers 124 and the pressure sensitive adhesive layer 120 in layers 124 may be attached to each other. In a second autoclave operation, layers 126 may be autoclaved and attached to layers 124.

The configuration of FIG. 11 may avoid the use of double autoclave operations in forming the lower portion of the display layers in display 50 (i.e., the layers below air gap 66) and may avoid the use of multiple broadband antireflection layers 112 to minimize costs.

Figure 13:
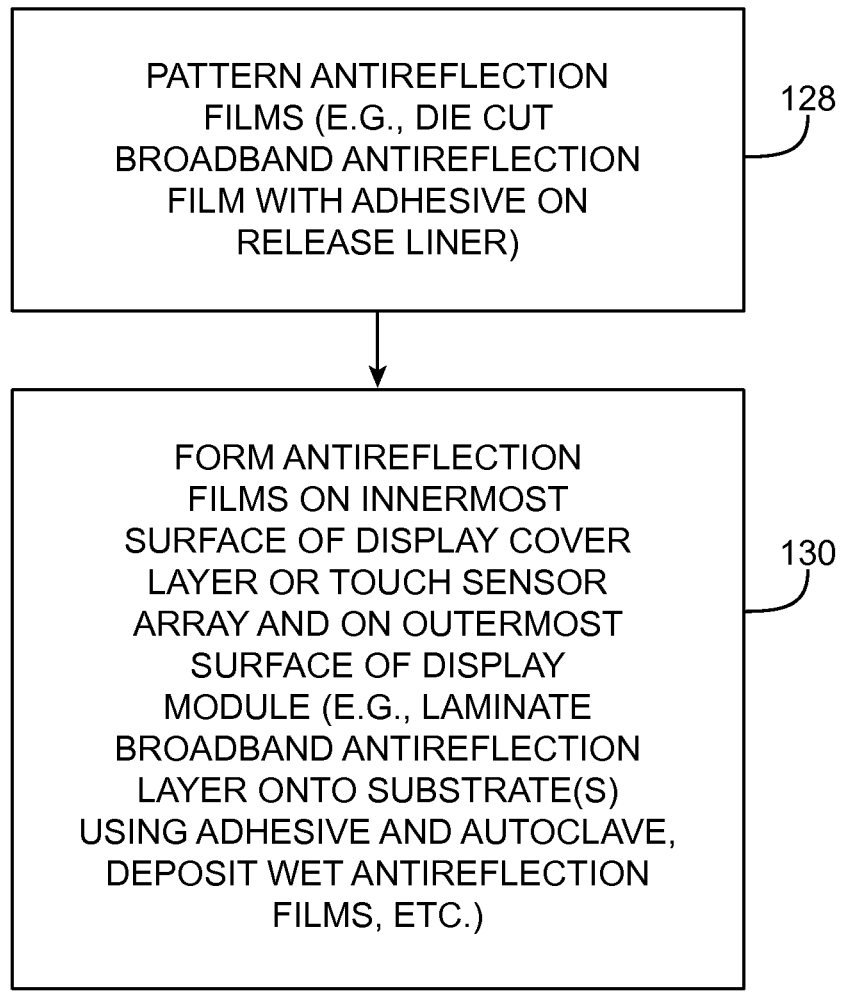
FIG. 13 is a flow chart of illustrative steps involved in forming display structures in accordance with an embodiment of the present invention.

FIG. 13 is a flow chart of illustrative steps involved in forming display 50. At step 128, antireflection films such as broadband antireflection film 112 may be formed. Broadband antireflection film 112 may be formed by running a sheet of polymer that lies on a release liner through an embossing tool to create a textured surface with protrusions 114 and valleys 116. Broadband antireflection film 112 may also be formed by depositing a polymer material directly on a desired display surface and by performing embossing operations on the deposited polymer material. If desired, broadband antireflection film 112 may be formed using other types of material (e.g., material with embedded nanoparticles, etc.). The use of an embossing tool to form broadband antireflection film 112 is merely illustrative.

At step 130, broadband antireflection film 112 and, if desired, antireflection coating 122 (e.g., wet antireflection coating 102 of FIG. 3, wet antireflection coating 102' of FIG. 4, or other antireflection coatings) may be formed on the surfaces of display 50 adjacent to air gap 66. Broadband antireflection film 112 may be attached using adhesive 120 or by depositing and processing the material for film 112 directly on a desired substrate. Antireflection coating 122 may be formed by depositing a hard coat layer followed by a relatively thin cover layer, as described in connection with FIGS. 3 and 4, by forming other types of wet antireflection films, or by forming antireflection coatings using other techniques.

The foregoing is merely illustrative of the principles of this invention and various modifications can be made by those skilled in the art without departing from the scope and spirit of the invention.

What is claimed is:

1. Display structures, comprising:
a touch sensor layer with first and second opposing sides;
a first patterned transparent electrode on the first side of the touch sensor layer;
a second patterned transparent electrode on the second side of the touch sensor layer;
a broadband antireflection layer, wherein the broadband antireflection layer comprises a textured surface that creates a continuously varying refractive index in a direction from the uppermost surface to the lowermost surface; and
display layers that generate an image, wherein the display structures comprise an antireflection layer, wherein the antireflection layer comprises first and second layers, and wherein the second layer includes hollow structures that are completely surrounded by the second layer, wherein the first layer comprises a polymer layer having a thickness of 5 to 7 microns, wherein the antireflection layer is in direct contact with the first patterned electrode.

2. The display structures defined in claim 1 wherein the first and second layers have respective first and second indices of refraction.

3. The display structures defined in claim 2 wherein the second layer comprises a polymer layer with a thickness of 20 to 500 nm.

4. The display structures defined in claim 1 wherein the display layers include a liquid crystal layer.

5. The display structures defined in claim 1 further comprising a display cover layer to which the touch sensor layer is attached.

6. An electronic device, comprising:
a housing;
a display cover layer;
a touch sensor substrate with a patterned transparent electrode on a lower surface of the touch sensor substrate;
display layers configured to generate an image, wherein the display layers include a polarizer;
a broadband antireflection layer having upper and lower surfaces and formed from a bulk material having a first index of refraction, wherein the broadband antireflection layer has a refractive index that varies continuously from the first index of refraction at the lower surface to a second index of refraction at the upper surface;
an antireflection layer in direct contact with the polarizer, wherein the antireflection layer and the broadband antireflection layer are separated by a gap; and
a layer of pressure sensitive adhesive with which the broadband antireflection layer is mounted within the electronic device, wherein the layer of pressure sensitive adhesive is interposed between and in direct contact with the broadband antireflection layer and the patterned transparent electrode.

7. The electronic device defined in claim 6 wherein the antireflection layer on the polarizer comprises at least first and second polymer layers with different respective first and second indices of refraction.

8. The electronic device defined in claim 6 wherein the broadband antireflection layer comprises a textured surface that creates a continuously varying refractive index.

9. The electronic device defined in claim 8 further comprising adhesive that attaches the display cover layer to the housing.

10. The electronic device defined in claim 8 further comprising:
an additional polarizer; and
a liquid crystal layer located between the polarizer and the additional polarizer.

11. The electronic device defined in claim 6 wherein the second index of refraction comprises an index of refraction of air.

12. The display structures defined in claim 1, wherein the display structures comprise a polarizer layer and wherein the antireflection layer is mounted on the polarizer layer.

13. The display structures defined in claim 1, wherein the display layers and the broadband antireflection layer are separated by an air gap.

14. The display structures defined in claim 1, wherein the hollow structures comprise silica beads.

15. The display structures defined in claim 3, wherein the first index of refraction is about 1.5 and the second index of refraction is between 1.2 and 1.3.

16. The display structures defined in claim 1, wherein the broadband antireflection layer is attached to a polarizer with pressure sensitive adhesive.

17. The display structures defined in claim 1, wherein the antireflection layer is in direct contact with the first side of the touch sensor layer.

18. The display structures defined in claim 17, wherein the first patterned transparent electrode has first and second opposing sides connected by third and fourth opposing sides, wherein the first side of the first patterned transparent electrode is in direct contact with the first side of the touch sensor layer, and wherein the second, third, and fourth sides of the first patterned transparent electrode are in direct contact with the antireflection layer.

* * * * *